(12) United States Patent
Kouthoofd

(10) Patent No.: US 11,584,018 B2
(45) Date of Patent: Feb. 21, 2023

(54) USER INTERACTIVE ELECTRONIC SYSTEM AND METHOD FOR CONTROLLING A ROBOTIC ARM

(71) Applicant: Teenage Engineering AB, Stockholm (SE)

(72) Inventor: Jesper Kouthoofd, Stockholm (SE)

(73) Assignee: Teenage Engineering AB, Stockholm (SE)

( * ) Notice: Subject to any disclaimer, the term of this patent is extended or adjusted under 35 U.S.C. 154(b) by 324 days.

(21) Appl. No.: 16/762,338

(22) PCT Filed: Nov. 7, 2018

(86) PCT No.: PCT/SE2018/051138
§ 371 (c)(1),
(2) Date: May 7, 2020

(87) PCT Pub. No.: WO2019/093952
PCT Pub. Date: May 16, 2019

(65) Prior Publication Data
US 2020/0338746 A1 Oct. 29, 2020

(30) Foreign Application Priority Data
Nov. 13, 2017 (SE) .................................. 1751404-3

(51) Int. Cl.
*G06F 19/00* (2018.01)
*B25J 11/00* (2006.01)
*B25J 15/00* (2006.01)
*B25J 9/16* (2006.01)

(52) U.S. Cl.
CPC ........... *B25J 11/005* (2013.01); *B25J 9/1669* (2013.01); *B25J 15/0019* (2013.01)

(58) Field of Classification Search
CPC .... B25J 11/005; B25J 9/1669; B25J 15/0019; B25J 11/003
See application file for complete search history.

(56) References Cited

U.S. PATENT DOCUMENTS

| | | | |
|---|---|---|---|
| 9,687,982 B1 | 6/2017 | Jules et al. | |
| 2012/0185096 A1* | 7/2012 | Rosenstein | B25J 5/007 901/1 |
| 2014/0039680 A1* | 2/2014 | Angle | G16H 40/63 901/1 |
| 2014/0277735 A1 | 9/2014 | Breazeal | |

(Continued)

FOREIGN PATENT DOCUMENTS

WO  2017169826 A1  10/2017

OTHER PUBLICATIONS

Extended European Search Report dated Aug. 11, 2021 for EP Application No. 18877044.0, 7 pages.

(Continued)

*Primary Examiner* — Abby Y Lin
*Assistant Examiner* — Sohana Tanju Khayer
(74) *Attorney, Agent, or Firm* — RMCK Law Group, PLC

(57) ABSTRACT

The present disclosure relates to a user interactive electronic system, the user interactive electronic system comprising a robotic arm and at least an attachment detachably affixed to a distal end of the robotic arm. The present disclosure also relates to a method for operating such a user interactive electronic system and to a computer program product.

11 Claims, 3 Drawing Sheets

(56) References Cited

U.S. PATENT DOCUMENTS

2016/0176043 A1    6/2016  Mishra et al.
2017/0190050 A1*  7/2017  Cookson .............. G05B 19/128

OTHER PUBLICATIONS

PCT International Search Report and Written Opinion dated Jan. 23, 2019 for International Application No. PCT/SE2018/051138, 11 pages.

* cited by examiner

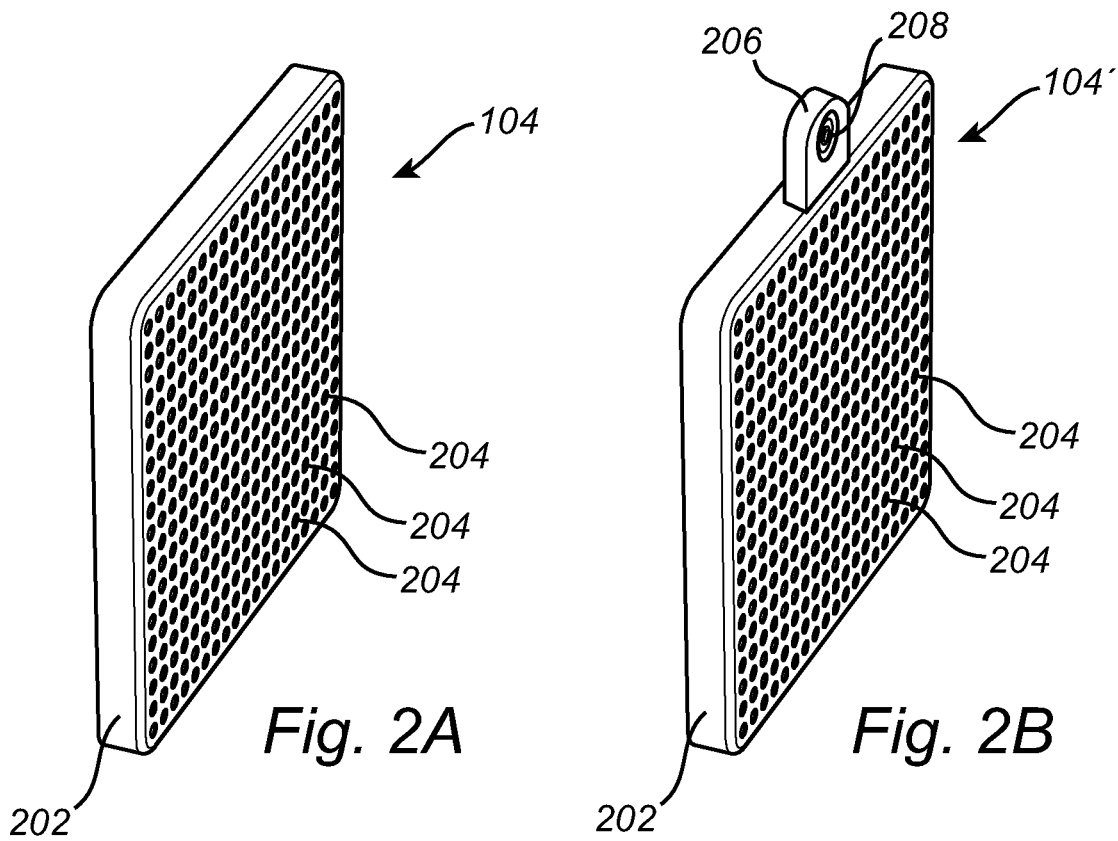
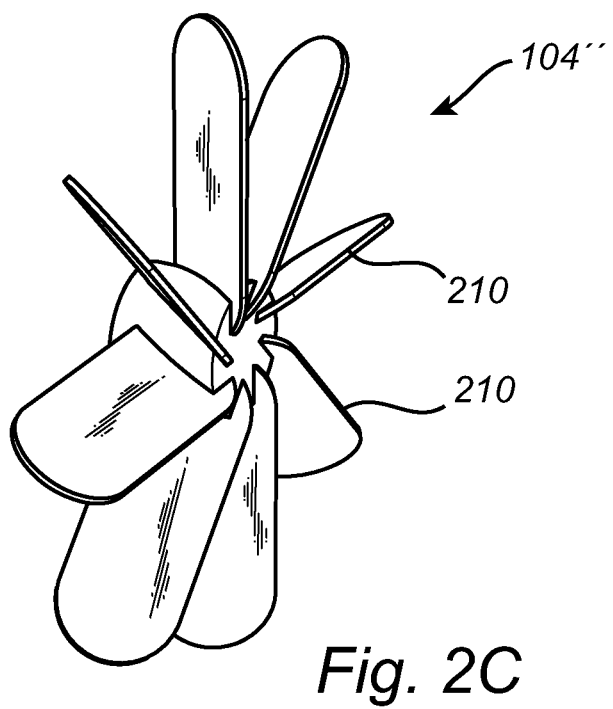

USER INTERACTIVE ELECTRONIC SYSTEM AND METHOD FOR CONTROLLING A ROBOTIC ARM

CROSS-REFERENCE TO RELATED APPLICATIONS

This application is a 371 U.S. National Stage of International Application No. PCT/SE2018/051138, filed Nov. 7, 2018, which claims priority to Swedish Patent Application No. 1751404-3, filed Nov. 13, 2017. The disclosures of each of the above applications are incorporated herein by reference in their entirety.

TECHNICAL FIELD

The present disclosure relates to a user interactive electronic system, the user interactive electronic system comprising a robotic arm and at least an attachment detachably affixed to a distal end of the robotic arm. The present disclosure also relates to a method for operating such a user interactive electronic system and to a computer program product.

BACKGROUND

Various types of interactive autonomous robots exist, residing and functioning continually in the environment of a person, such as within a home environment. Recently, with the advances made within the area of artificial intelligence, robots have been presented that dynamically interact with the person/user based on e.g. a requirement of the person/user.

An example of such a robot is disclosed in US20140277735, presenting a telecommunications enabled robotic device adapted to persist in an environment of a user. The robotic device disclosed in US20140277735 is adapted to consider the social and emotional particulars of a particular situation and its user, and to interact accordingly. The robotic device disclosed in US20140277735 may for example be adapted to handle voice or image input for capturing the emotion of, recognize the identity and gestures of, and maintain interaction with user.

The robotic device disclosed in US20140277735 shows an interesting approach in how to e.g. assist a user/person in an everyday situation within the home environment. However, the robotic device is strictly limited to assistance in regards to a fixed hardware configuration for assisting the user/person, only relying on possible software updates for further extending services to the user/person. Accordingly, there appears to be room for further improvement, specifically allowing for an improved flexibility of such a robotic device, making it future-proof to yet unforeseen services that could be provided to the user/person.

SUMMARY

In view of above-mentioned and other drawbacks of the prior art, it is an object of the present disclosure to provide an improved robotic device for use in a home environment for assisting a user/person in the everyday life.

According to an aspect of the present disclosure, it is therefore provided a user interactive electronic system, comprising base device comprising a controllable robotic arm, the robotic arm having a proximate end and a distal end, at least an attachment adapted to be detachably affixed to the distal end of the robotic arm, the attachment being one of a plurality of different types of attachments, a sensor arrangement adapted to acquire information indicative of a user behavior, and a control unit arranged in communication with the sensor arrangement and adapted to control movement of the robotic arm, wherein the control unit is further adapted to receive the information indicative of the user behavior from the sensor arrangement, determine the type of attachment affixed to the robotic arm, receive or form a movement pattern based on the type of attachment and a user desire related to the user behavior, and control the robotic arm based on the movement pattern.

The present disclosure is based upon the realization that it would be advantageous to configure the user interactive electronic system such that it possibly may be continuously adaptable with different types of attachments. However, for allowing an operation of such a user interactive electronic system to be smooth and user friendly, not forcing the user to make configurations when the attachment is changed, the user interactive electronic system according to the present disclosure is configured to automatically determine the type of attachment. Thus, the user needs only to affix the attachment to the distal end of the robotic arm, and the user interactive electronic system will then automatically handle all settings necessary for further operation of the user interactive electronic system.

In addition, in accordance to the present disclosure, not only is the configuration based on the affixed attachment made in an automated manner. Rather, also the control of movement of the robotic arm will be dependent on the type of attachment. Accordingly, in a typical scenario the robotic arm may be allowed to behave differently for a similar user behavior, i.e. in case a first type of attachment being affixed vs. a similar situation where a second attachment is affixed.

Thus, in accordance with the present disclosure, the user interactive electronic system will (automatically) behave differently dependent on the affixed attachment, thus allowing the operation of the user interactive electronic system to be continuously developed once e.g. new types of attachments are made available. Accordingly, future services possibly being allowed to be provided to the user of the user interactive electronic system will not be limited to an initial hardware configuration of the user interactive electronic system. Rather, once future/further attachments are made available, such future/further attachments may form part of allowing the user to be provided with future/further services.

As defined above, the sensor arrangement adapted to acquire information indicative of a user behavior, where the user behavior for example may be selected from a group comprising the presence of a user, a location of the user, an identity of the user, a movement of the user, a gesture of the user, a voice of the user. The control unit may then take this acquired information and there though derive a user desire from the acquired information. That is, a user behavior will be used as an input for determining the desire of the user. For example, in case the user waves his hand up and down in front of the to the user interactive electronic system, this will be interpreted by the control unit as an instruction to the user interactive electronic system for performing a specific function.

Preferably, the robotic arm comprises a plurality of connected segments, typically connected to each other using at least one joint. Accordingly, the movement pattern for the user interactive electronic system may be allowed to take into account the structural set-up of the robotic arm, such as for example by allowing the robotic arm to move towards and away from the user/person interacting with the user interactive electronic system. It is preferred to arrange the movement pattern such that the movement of the robotic arm is "smooth" and perceived as relatively natural dependent on the structural appearance of the user interactive electronic system.

In a possible embodiment the joints are configured to detect a user interaction with the robotic arm. That is, in case e.g. the user "pushes" or in any way provokes the robotic arm this may form part of the user behavior used for determining the user desire. For example, in case the user "pushes down" the robotic arm (or the attachment), this may be interpreted (user behavior to generate a user desire) for pausing or shutting down the user interactive electronic system. When the user later "lifts up" the robotic arm (or the attachment), this may possibly be interpreted as a way of re-activating the user interactive electronic system.

In a preferred embodiment of the present disclosure the sensor arrangement comprises at least one of a camera and a microphone. Accordingly, the at least one camera and/or microphone may be used for locating the user/person as well as for collecting information as to the user behavior, to subsequently be used for determining the user desire. As such, the user interactive electronic system may e.g. be voice (in relation to the microphone) or movement (in relation to the camera) controlled. That is, the user may interact with the user interactive electronic system for instructing the user interactive electronic system to perform a service for the user.

It may also be advantageous to allow the user interactive electronic system to comprise at least one of a speaker element and a display element. The at least one speaker element and a display element may in some embodiments used for providing feedback to the user, such as using spoken (using the speaker element) and/or visual feedback. The speaker may possibly be used for playing music for the user.

The microphone, camera, speaker element and/or display element may be comprised with either of the base device and the attachment. In some embodiments the speaker element and/or microphone is comprised with the base device and at least one of the display element and the camera is comprised with the attachment.

In some embodiments it may be possible to allow the attachment to comprise e.g. a touch screen, a fingerprint sensor, an NFC reader, etc. Accordingly, in case for example an identity of the user to be authenticated, the user interactive electronic system may be configured to detect a position of the user and extend (using the received/formed movement pattern for the present type of attachment) the distal end with the affixed attachment in a direction of the user. The user may then interact with the e.g. touch screen (possibly also showing a graphical user interface, GUI) for inputting e.g. a PIN code or with the fingerprint sensor for fingerprint authentication.

In an alternative embodiment the attachment may comprise e.g. a fan. Accordingly, the user interactive electronic system may determine a position of the user and then extend (using the received/formed movement pattern for the present type of attachment) the distal end with the affixed "fan attachment" for "cooling" the user. Similarly, an attachment comprising a camera may be directed towards the user for taking a photo of the user.

It may in some embodiment of the present disclosure be desirable to equip the user interactive electronic system with means for allowing networked communication with e.g. a remote server, wherein the information indicative of the user behavior is provided to the server and the server is adapted for determining the user desire. Accordingly, resources available at the server may thereby be used for e.g. autonomous determination of the user desire. The resources at the server may in some embodiment at least partly implement functionality related to machine learning and data mining. The machine learning process may be either of an unsupervised machine learning process or a supervised machine learning process, for example related to the concept of artificial intelligence (AI). However, it should be understood that at least some of the mentioned determination may be performed locally at the user interactive electronic system. For example, the remote server may determine general instructions relating to the movement pattern (e.g. attachment type independent), to be "blended" with a type related movement pattern available locally at the user interactive electronic system for determining instructions for controlling the robotic arm.

According to another aspect of the present disclosure, there is provided a computer implemented method for operating a user interactive electronic system, the system comprising base device comprising a controllable robotic arm, the robotic arm having a proximate end and a distal end, at least an attachment adapted to be detachably affixed to the distal end of the robotic arm, the attachment being one of a plurality of different types of attachments, a sensor arrangement adapted to acquire information indicative of a user behavior, and a control unit arranged in communication with the sensor arrangement and adapted to control movement of the robotic arm, wherein the method comprises receiving the information indicative of the user behavior from the sensor arrangement, determining the type of attachment affixed to the robotic arm, receiving or forming a movement pattern based on the type of attachment and a user desire related to the user behavior, and controlling the robotic arm based on the movement pattern. This aspect of the present disclosure provides similar advantages as discussed above in relation to the previous aspects of the present disclosure.

According to a further aspect of the present disclosure, there is provided a computer program product comprising a non-transitory computer readable medium having stored thereon computer program means for a control unit adapted for controlling a user interactive electronic system, the user interactive electronic system comprising base device comprising a controllable robotic arm, the robotic arm having a proximate end and a distal end, at least an attachment adapted to be detachably affixed to the distal end of the robotic arm, the attachment being one of a plurality of different types of attachments, a sensor arrangement adapted to acquire information indicative of a user behavior, and a control unit arranged in communication with the sensor arrangement and adapted to control movement of the robotic arm, wherein the computer program product comprises code for receiving the information indicative of the user behavior from the sensor arrangement, code for determining the type of attachment affixed to the robotic arm, code for receiving or forming a movement pattern based on the type of attachment and a user desire related to the user behavior, and controlling the robotic arm based on the movement pattern. Also this aspect of the present disclosure provides similar advantages as discussed above in relation to the previous aspects of the present disclosure.

The control unit is preferably an ASIC, a microprocessor or any other type of computing device. A software executed by the control unit for operating the inventive system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which:

FIGS. 2A-2C show examples of possible attachments to be comprised with a user interactive electronic system;

DETAILED DESCRIPTION

Figure 1B:
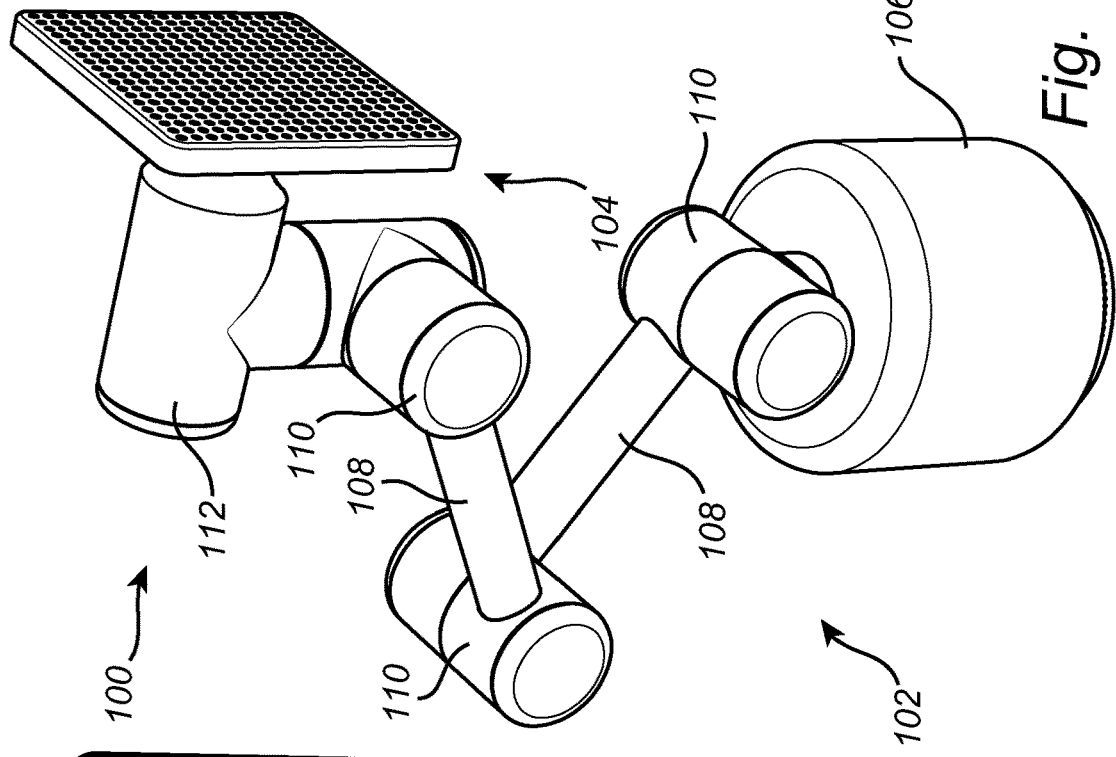
FIGS. 1A and 1B schematically exemplify a user interactive electronic system according to an embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1A:
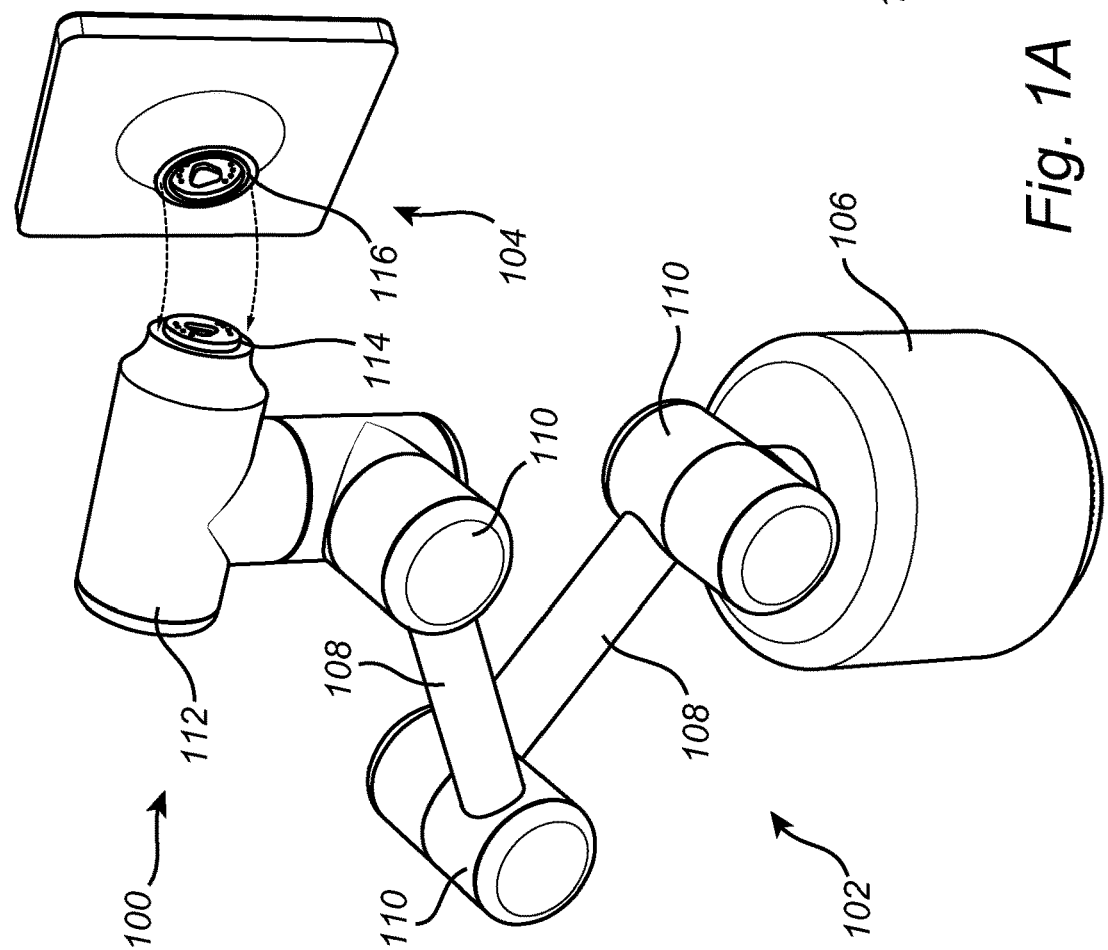

Turning now to the drawings and to FIGS. 1A, 1B and 2A in particular, there is schematically illustrated an example embodiment of a user interactive electronic system 100. The user interactive electronic system 100 comprises a base device 102 and an attachment 104. The base device 102 comprises a base portion 106, forming a foundation for the user interactive electronic system 100.

The base portion 106 further comprising an elongated robotic arm having a proximate end and a distal end. The terms "proximal" and "distal" are used herein with reference to the base portion 106 and the attachment 104. The term "proximal end" referring to the portion of the robotic arm closest to the base portion 106 and the term "distal end" referring to the portion of the robotic arm located closest to the attachment 104. The robotic arm comprises a plurality of segments 108, connected with joints 110. In the illustrated embodiment the robotic arm comprises two segments 108 and three joints 110. Accordingly the robotic arm may be moved in six degrees of freedom. It could of course be possible to arrange the robotic arm to comprise more or less segments 108 and joints 110.

The base portion 106 further comprises a head portion 112. The head portion 112 may be rotated, preferably 360 degrees. The head portion 112 further comprises a first connector portion 114 adapted to for mechanical and optionally electrical connection with a second (matching) connector portion 116 comprised with the attachment 114.

In the illustrated embodiment as shown in FIG. 1A the first 114 and the second 116 connector portions are arranged to allow for both of a mechanical and electrical connection between the base portion 102 and the attachment 104. However, it may in some embodiments be possible to allow each of the base portion 102 and the attachment 104 to have separate power supplies, such as allowing the base portion 102 to be connected to e.g. the mains and the attachment to comprise an e.g. chargeable battery. The The base portion 102 may further be arranged to comprise a first control unit (not shown), adapted to control at least the robotic arm. Similarly, the attachment 104 may in some embodiments comprise a second control unit (not shown). However, in some embodiments only one of the base portion 102 and the attachment 104 is arranged to comprise a (single) control unit. Either or both of the base portion 102 and the attachment 104 may comprise means for allowing network communication, such as wireless communication using e.g. Wi-Fi, Bluetooth or similar. In some embodiments the communication between the base portion 102 and the attachment 104 is wired (such as using serial communication) through the electrical part of the first 114 and the second 116 connector portions. However, the communication between the base portion 102 and the attachment 104 may also or alternatively be wireless.

As mentioned above, either or both of the base portion 102 and the attachment 104 may be arranged to comprise a sensor arrangement. Such a sensor arrangement may for example comprise a microphone, a camera, etc. Either or both of the base portion 102 and the attachment 104 may comprise a speaker element and/or a display element.

The first, second and/or single control unit may include a microprocessor, microcontroller, programmable digital signal processor or another programmable device. The control unit may also, or instead, each include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The exemplary attachment 104 shown in FIGS. 1A, 1B and 2A further comprises a base plate 202 having a front side and a back side. As shown in FIG. 1A, the second connector portion 116 is arranged at the backside of the attachment 104. In the illustration shown in FIGS. 1B and 2A, the front side of the attachment 104 is provided with a display element, in the illustrated embodiment comprising a plurality of light emitting elements, such as a plurality of light emitting diodes (LEDs) 204. The LEDs 204 are in the illustrated embodiment arranged in a matrix formation, where each of the LEDs 204 are individually controllable, typically for use in interaction with a user. Accordingly, the LEDs 204 may for example be used for showing an instruction to the user, an emotion (such as by showing an illustration of an emoji, etc.). It should be understood that other types of display elements may be used, such as a liquid crystal display (LCD) for showing an image. Such a display element may also be configured for receiving user input, for example by arranging such a display element as a touch screen.

Turning now to FIG. 2B which illustrates an alternative embodiment of an attachment 104', in essence corresponding to the attachment 104 as shown in FIGS. 1A, 1B and 2A. However, the embodiment shown in FIG. 2B further comprises a camera portion 206 in turn comprising an image sensor and lens arrangement 208.

A further exemplary embodiment of an attachment 104" is shown in FIG. 2C. The attachment 104" is arranged to correspond a second 116 connector portion as the attachments 104 and 104. However, rather than comprising a display element/camera, the attachment 104" comprises a fan portion including a plurality of fan blades 210. The attachment 104" may also, optionally, comprise a camera and/or microphone arranged e.g. at a center of the pan portion.

Figure 3:
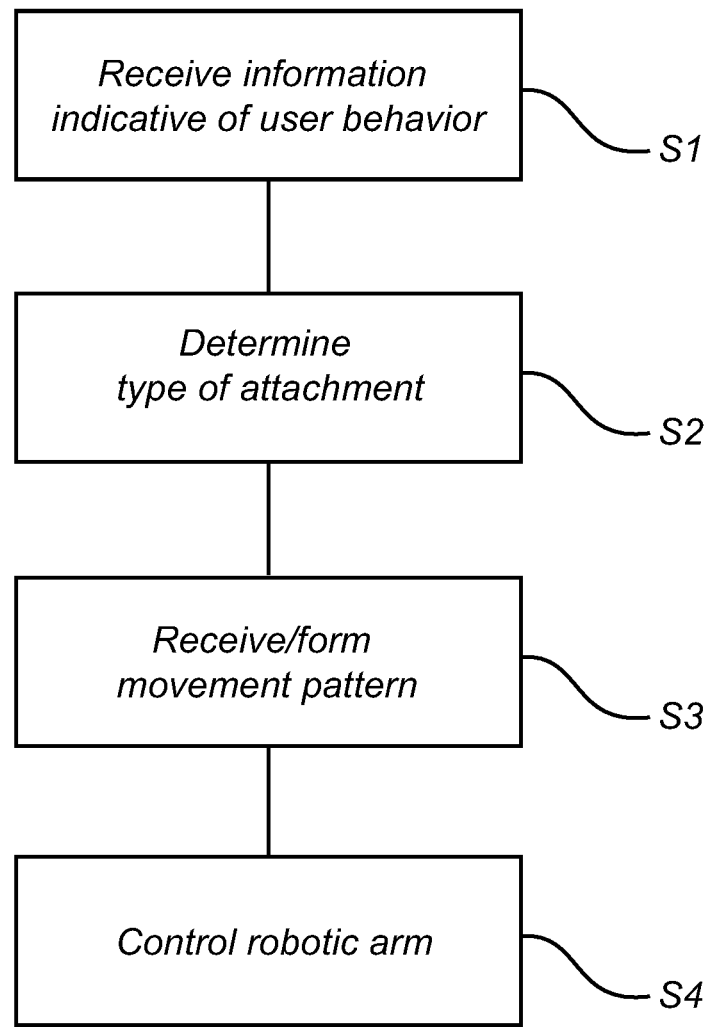
FIG. 3 is a flowchart illustrating the operation of the user interactive electronic system according to the present disclosure.

Turning finally to FIG. 1B in conjunction with FIG. 3, together illustrating an exemplary general operation of the user interactive electronic system 100. As discussed above, the sensor arrangement, such as including the mentioned microphone and or the camera portion 206 may be adapted to collect data relating to the user, such as related to a behavior of the user. Typically, the control unit receives, S1, the information indicative of the user behavior. The control unit also receives information from the attachment 104 once the attachment has been affixed to the base device 102. Such information may for example comprise an indication of an identity of the attachment 104, allowing the control unit to determine a type of the attachment 104. Possibly, the control unit may receive the indication of the identity and send a request to e.g. a remotely located server holding information that allows the control unit to determine, S2, the determining the type of attachment affixed to the robotic arm.

In addition, the control unit may in some embodiments provide the data relating to the user behavior to the remote server, where the remote server inputs the data relating to the user behavior into a machine learning model for determining a user desire. This determination may however be at least partly (or fully) determined locally at the user interactive electronic system 100. Based on the type of attachment and the determined user desire at least one of the remote server and the user interactive electronic system 100 may determine or form a movement pattern for the user interactive electronic system 100. The movement pattern may for example relate to extending the distal end of the robotic arm, and thus the attachment 104, in a direction where the user has previously been detected. For example, in case the user has provided a voice input to microphone comprised with the user interactive electronic system 100, for example with a request to order a home delivered pizza, the robotic arm may once the pizza order has been delivered to the pizza restaurant move, S4, in a "dancing manner" and showing a countdown timer at the display element indicating the time until the pizza will be delivered. The movement of the robotic arm will as such be dependent on the user desire.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A user interactive electronic system, comprising:
base device comprising a controllable robotic arm, the robotic arm having a proximate end and a distal end,
at least an attachment adapted to be detachably affixed to the distal end of the robotic arm, the attachment being one of a plurality of different types of attachments,
a sensor arrangement adapted to acquire information indicative of a user behavior, the user behavior being selected from a group comprising the presence of a user, a location of the user, an identity of the user, a movement of the user, a gesture of the user, a voice of the user, and
a control unit arranged in communication with the sensor arrangement and adapted to control movement of the robotic arm,
wherein the control unit is further adapted to:
receive the information indicative of the user behavior from the sensor arrangement,
determine the type of attachment affixed to the robotic arm,
receive or form a movement pattern based on the type of attachment and a user desire derived from the user behavior, wherein a specific user desire will have different impact on the movement pattern depending on the type of the attachment such that the user behavior will result in: (i) a first movement pattern when a first attachment of the plurality of different types of attachments is affixed to the robotic arm, and (ii) a second movement pattern different than the first movement pattern when a second attachment of the plurality of different types of attachments is affixed to the robotic arm, and
control the robotic arm based on the movement pattern.

2. The system according to claim 1, wherein the robotic arm comprises a plurality of connected segments.

3. The system according to claim 2, wherein the plurality of segments are connected to each other using at least one joint.

4. The system according to claim 1, wherein the sensor arrangement comprises at least one of a camera and a microphone.

5. The system according to claim 1, further comprising at least one of a speaker element and a display element.

6. The system according to claim 1, further comprising a communication device for allowing networked communication with a remote server, wherein the information indicative of the user behavior is provided to the server and the server is adapted for determining the user desire.

7. The system according to claim 1, wherein the movement pattern is different for different types of attachments for a corresponding user desire.

8. A computer implemented method for operating a user interactive electronic system, the system comprising:
   base device comprising a controllable robotic arm, the robotic arm having a proximate end and a distal end,
   at least an attachment adapted to be detachably affixed to the distal end of the robotic arm, the attachment being one of a plurality of different types of attachments,
   a sensor arrangement adapted to acquire information indicative of a user behavior, the user behavior being selected from a group comprising the presence of a user, a location of the user, an identity of the user, a movement of the user, a gesture of the user, a voice of the user, and
   a control unit arranged in communication with the sensor arrangement and adapted to control movement of the robotic arm,
wherein the method comprises:
   receiving the information indicative of the user behavior from the sensor arrangement,
   determining the type of attachment affixed to the robotic arm,
   receiving or forming a movement pattern based on the type of attachment and a user desire derived from the user behavior, wherein a specific user desire will have different impact on the movement pattern depending on the type of the attachment such that the user behavior will result in: (i) a first movement pattern when a first attachment of the plurality of different types of attachments is affixed to the robotic arm, and (ii) a second movement pattern different from the first movement pattern when a second attachment of the plurality of different types of attachments is affixed to the robotic arm, and
   controlling the robotic arm based on the movement pattern.

9. The method according to claim 8, further comprising:
   establishing a network connection between the control unit and a remotely located server,
   providing the information indicative of the user behavior to the server, and
   determining, at the server, user desire based on the information indicative of the user behavior.

10. The method according to claim 8, further comprising:
    providing a plurality of different type of attachments,
    selecting one of the different types of attachments, and
    affixing the selected one attachment to the distal end of the robotic arm.

11. A computer program product comprising a non-transitory computer readable medium having stored thereon computer program means for a control unit adapted for controlling a user interactive electronic system, the user interactive electronic system comprising:
    base device comprising a controllable robotic arm, the robotic arm having a proximate end and a distal end,
    at least an attachment adapted to be detachably affixed to the distal end of the robotic arm, the attachment being one of a plurality of different types of attachments,
    a sensor arrangement adapted to acquire information indicative of a user behavior, the user behavior being selected from a group comprising the presence of a user, a location of the user, an identity of the user, a movement of the user, a gesture of the user, a voice of the user, and
    a control unit arranged in communication with the sensor arrangement and adapted to control movement of the robotic arm,
wherein the computer program product comprises:
    code for receiving the information indicative of the user behavior from the sensor arrangement,
    code for determining the type of attachment affixed to the robotic arm,
    code for receiving or forming a movement pattern based on the type of attachment and a user desire derived from the user behavior, wherein a specific user desire will have different impact on the movement pattern depending on the type of the attachment such that the user behavior will result in: (i) a first movement pattern when a first attachment of the plurality of different types of attachments is affixed to the robotic arm, and (ii) a second movement pattern different than the first movement pattern when a second attachment of the plurality of different types of attachments is affixed to the robotic arm, and
    code for controlling the robotic arm based on the movement pattern.

* * * * *